United States Patent [19]
Kanno et al.

[11] Patent Number: 5,299,034
[45] Date of Patent: Mar. 29, 1994

[54] IMAGE PROCESSING APPARATUS AND IMAGE PROCESSING METHOD FOR REPRODUCING A COLOR IMAGE FROM COLOR SIGNALS HAVING DIFFERENT PHASES

[75] Inventors: Hiroki Kanno, Yokohama; Hitoshi Yoneda, Kawasaki, both of Japan

[73] Assignee: Kabushiki Kaisha Toshiba, Kawasaki, Japan

[21] Appl. No.: 826,807

[22] Filed: Jan. 28, 1992

[30] Foreign Application Priority Data

Mar. 30, 1991 [JP] Japan .................................. 3-093647

[51] Int. Cl.$^5$ .................................................. G03F 3/08
[52] U.S. Cl. ........................... 358/518; 358/501; 358/504; 358/523
[58] Field of Search ................ 358/75, 80, 443, 447, 358/448, 501, 504, 515, 517, 518, 521, 523, 524

[56] References Cited

U.S. PATENT DOCUMENTS

| | | | |
|---|---|---|---|
| 4,328,515 | 5/1982 | Wellendorf | 358/523 |
| 4,654,721 | 3/1987 | Goertzel | 358/501 |
| 5,070,413 | 12/1991 | Sullivan et al. | 358/80 |
| 5,184,213 | 2/1993 | Ishida | 358/80 |

OTHER PUBLICATIONS

Floyd et al., "An Adaptive Algorithm for Spatial Greyscale", 1975, pp. 75-77.

Primary Examiner—Edward L. Coles, Sr.
Assistant Examiner—Thomas D. Lee
Attorney, Agent, or Firm—Foley & Lardner

[57] ABSTRACT

An image processing apparatus having a first conversion section for converting image data of a target pixel in a multi-color image as an object to be processed into first color data corresponding to colors of the image data, a second conversion section for converting the first color data converted by the first conversion section into binary data, a first calculation section for calculating second color data having the same colors as those of the image data on the basis of a plurality of the binary data converted by the second conversion section, a second calculation section for calculating color errors between the image data and the second color data calculated by the first calculation section, a third calculation section for calculating weighting errors by multiplying the color errors calculated by the second calculation section with predetermined weighting coefficients, a storage section for storing the weighting errors calculated by the third calculation section, and a correction section for correcting the image data of the target pixel according to the weighting errors stored in the storage section.

11 Claims, 4 Drawing Sheets

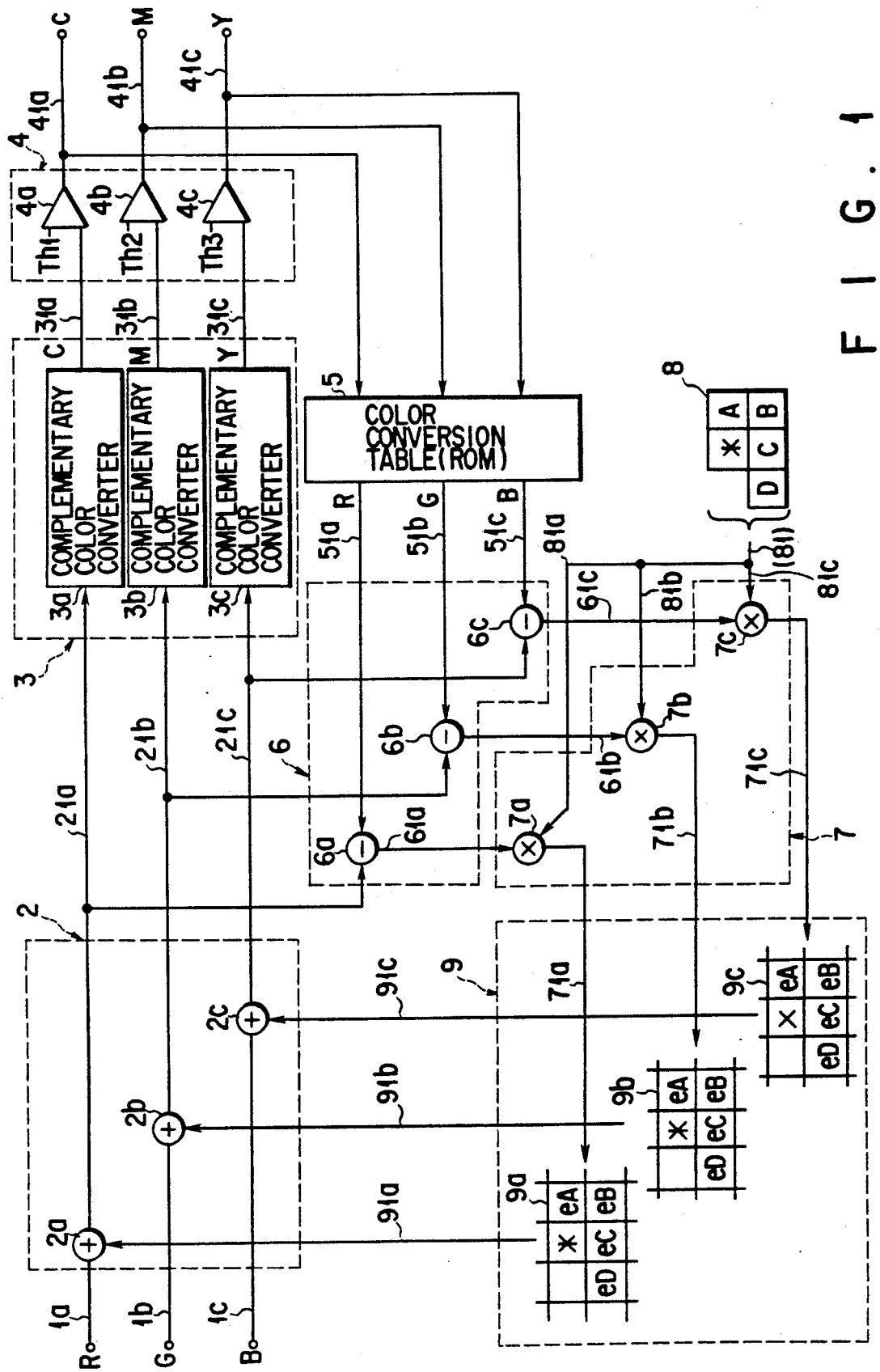
F I G. 1

|     | R    | G    | B    |
|-----|------|------|------|
| C   | 0.04 | 0.32 | 0.50 |
| M   | 0.71 | 0.49 | 0.37 |
| Y   | 0.77 | 0.49 | 0.04 |
| R   | 0.71 | 0.04 | 0.02 |
| G   | 0.05 | 0.23 | 0.04 |
| B   | 0.05 | 0.04 | 0.27 |
| BK  | 0.05 | 0.03 | 0.02 |
| W   | 0.76 | 0.79 | 0.81 |

ROM 5

FIG. 4

IMAGE PROCESSING APPARATUS AND IMAGE PROCESSING METHOD FOR REPRODUCING A COLOR IMAGE FROM COLOR SIGNALS HAVING DIFFERENT PHASES

BACKGROUND OF THE INVENTION

1. Field of the Invention

The present invention relates to an image processing apparatus by which gradation processing with high color reproduction fidelity can be attained for a color image of an object.

2. Description of the Related Art

In an image processing apparatus for processing a color image, gradation processing and color correction processing are required so as to output, to a color printer, color signals read from an original using a reading device such as a color image scanner.

In color reproduction processing, for example, R, G, and B (R: red, G: green, and B: blue) signals from a scanner are converted into Y, M, and C (Y: yellow, M: magenta, and C: cyan) complementary color signals, as printer drive signals for original color signals. This processing is performed by a 3×3 matrix operation given by equation (1):

$$\begin{pmatrix} Y \\ M \\ C \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R \\ G \\ B \end{pmatrix} \quad (1)$$

On the other hand, an ordered dither method is generally used for the gradation processing. This method is simple, but undesirably impairs resolution of the resultant image.

An "error diffusion method" is known as a gradation processing method, which can provide higher resolution than the ordered dither method, and can also provide a sufficient gradation characteristic.

As U.S. Patent applications that disclose gradation processing methods using the error diffusion method, there are the following prior applications filed by the same applicants as for the present application:

(1) U.S. Ser. No. 756,630 filed on Sep. 9, 1991, and
(2) U S. Ser. No. 785,788 filed on Oct. 31, 1991.

All of the disclosures of these prior patent applications are incorporated in the present patent application.

In the "error diffusion method", a product of a digitization error of digitized surrounding pixels with a given weighting coefficient is added to a color signal of the target pixel, thus obtaining a digitized color signal of the target pixel by a fixed threshold value.

In the "error diffusion method", the digitization error generated upon digitization of the target pixel is diffused to the surrounding pixels to perform error compensation, thereby minimizing the digitization error. Therefore, when an input image is a photographic image, digitization processing can be performed to assure a satisfactory high gradation characteristic. However, in a color image, when the "error diffusion method" is independently applied to R, G, and B input color signals (three color signals), the three Y, M, and C digitized output signals cannot be in phase with each other. Thus, the digitized output signals having different phases are undesirably output, and a color image cannot be faithfully reproduced.

SUMMARY OF THE INVENTION

It is, therefore, an object of the present invention to provide an image processing apparatus, which can faithfully reproduce a color image even when a plurality of digitized output signals corresponding to a plurality of color signals have different phases.

An image processing apparatus according to the present invention comprises a converter for converting image data of a target pixel in a multi-color image as an object to be processed into first color data corresponding to colors of the image data, a digitizer for converting the first color data converted by the converter into binary data, a color calculator for calculating second color data having the same colors as those of the image data on the basis of a plurality of binary data digitized by the digitizer, an error calculator for calculating color errors between the second color data calculated by the color calculator and the image data, a weighting error calculator for calculating weighting errors by multiplying the color errors calculated by the error calculator with predetermined weighting coefficients, an error storage section for storing the weighting errors calculated by the weighting error calculator, and a corrector for correcting the image data of the target pixel according to the weighting errors stored in the error storage section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic diagram for explaining the digitization processing according to the present invention;

FIG. 4 shows an example of a color conversion table.

DETAILED DESCRIPTION OF THE PREFERRED EMBODIMENTS

Figure 2:
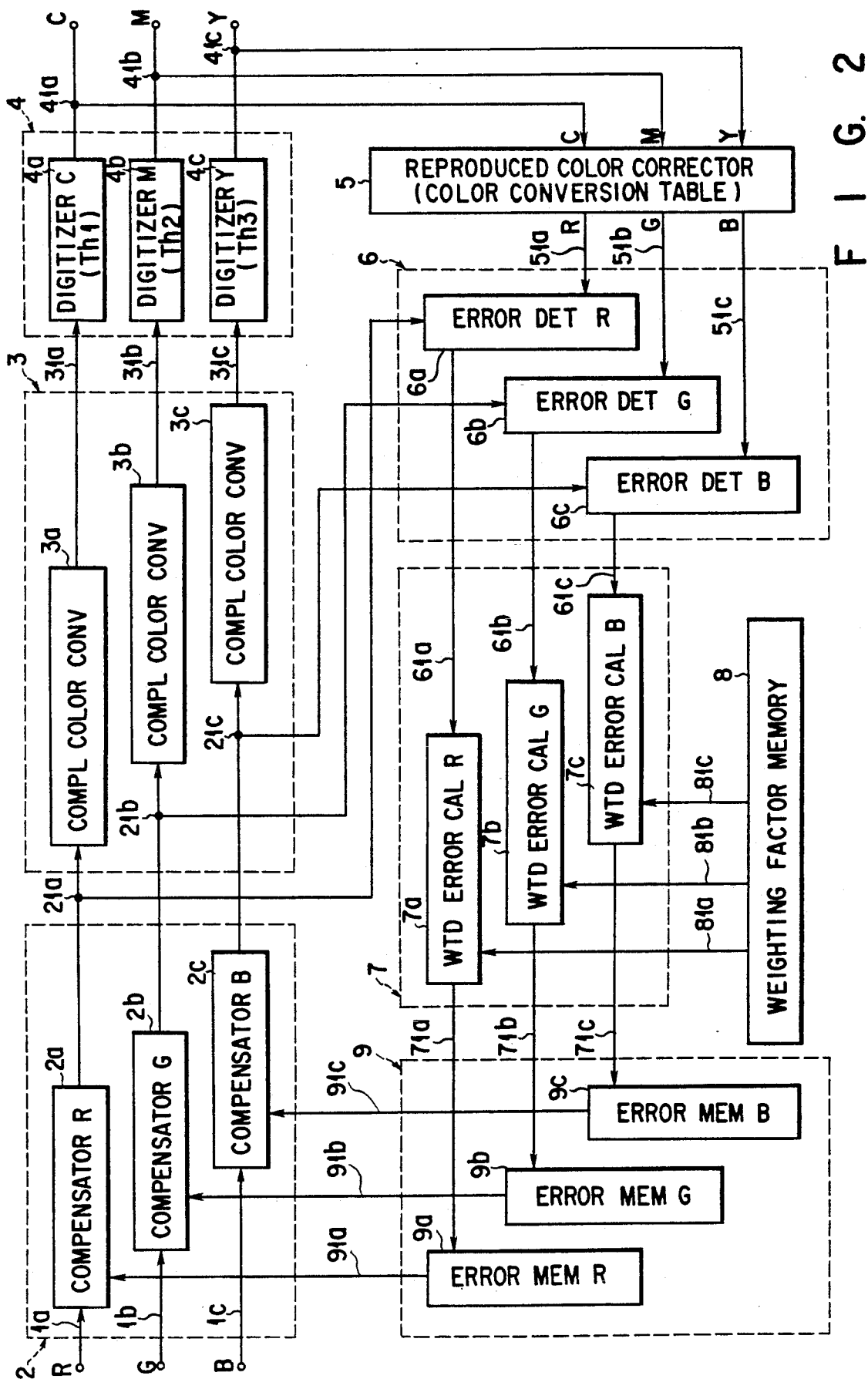
FIG. 2 is a schematic block diagram showing an arrangement of an image processing apparatus according to an embodiment of the present invention.

The present invention will be described hereinafter with reference to the accompanying drawings.

FIG. 1 is a schematic diagram showing a digitization processing method according to the present invention. More specifically, in FIG. 1, reference 1a, 1b, and 1c denote R, G, and B (R: red, G: green, and B: blue) input color signals; 2 (2a, 2b, and 2c), a correction section for correcting color signals 1a, 1b, and 1c of a target pixel (*); 21a, 21b, and 21c, corrected color signals; 3 (3a, 3b, and 3c), a complementary color conversion section for converting R, G, and B corrected color signals 21a, 21b, and 21c into C, M, and Y (C: cyan, M: magenta, and Y:

yellow) complementary color signals 31a, 31b, and 31c, respectively; (4a, 4b, and 4c), a digitizer section for digitizing C, M, and Y complementary color signals 31a, 31b, and 31c; 41a, 41b, and 41c, digitization (binary) color signals; 5, a color conversion table (ROM) used for calculating reproduction color signals 51a, 51b, and 51c on the basis of C, M, and Y digitization color signals 41a, 41b, and 41c; 6 (6a, 6b, and 6c), a digitization error calculation section for calculating digitization error signals 61a, 61b, and 61c; 8, a weighting coefficient memory for storing weighting coefficients for calculating weighting errors; 7 (7a, 7b, and 7c), a weighting error calculation section for multiplying the digitization errors calculated by digitization error calculation section 6 (6a, 6b, and 6c) with weighting coefficients 81 (81a, 81b, 81c) from weighting coefficient memory 8; 9 (9a, 9b, and 9c), an error memory for storing weighting errors 71a, 71b, and 71c calculated by weighting error calculation section 7 (7a, 7b, and 7c); and 91a, 91b, and 91c, correction signals corresponding to weighting errors 71a, 71b, and 71c.

An example of the digitization processing method of the present invention will be described in detail below.

R, G, and B input color signals 1a, 1b, and 1c obtained by, e.g., reading or capturing an original image by a reading device, such as a color image scanner, are respectively subjected to correction processing using correction signals 91a, 91b, and 91c (to be described later) by correction section 2 (2a, 2b, and 2c), thereby outputting corrected color signals 21a, 21b, and 21c. These corrected color signals 21a, 21b, and 21c are respectively converted into C, M, and Y complementary color signals 31a, 31b, and 31c as color-printer drive signals by complementary color conversion section 3 (3a, 3b, and 3c).

These complementary color signals 31a, 31b, and 31c are respectively compared with digitization threshold values Th1 to Th3 (e.g., Th1=Th2=Th3="80h", the suffix "h" indicates "hex", or hexadecimal notation) by digitizer section 4 (4a, 4b, and 4c), thereby outputting digitization color signals 41a, 41b, and 41c. (Here, different threshold values (Th1≠Th2≠Th3) may be used in units of colors). More specifically, when complementary color signal 31a, 31b, or 31c is larger than corresponding threshold value Th (one of Th1 to Th3), "1" is output as binary color signal 41a, 41b, or 41c; otherwise, is output.

FIG. 4 shows an example of color conversion table 5. Color conversion table 5 outputs R, G, and B reproduction color signals 51a, 51b, and 51c on the basis of C, M, and Y digitization color signals 41a, 41b, and 41c. Digitization error calculation section 6 (6a, 6b, and 6c) calculates the differences between corrected color signals 21a, 21b, and 21c and reproduction color signals 51a, 51b, and 51c ("0h" if the digitization color signal is "0", or "ffh" if it is "1"), and outputs these calculation results as digitization error signals 61a, 61b, and 61c. Weighting error calculation section 7 (7a, 7b, and 7c) calculates weighting errors 71a, 71b, and 71c. These weighting errors are obtained by respectively multiplying digitization error signals 61a, 61b, and 61c with weighting coefficients A, B, C, and D of each of weighting coefficient data 81a, 81b, and 81c obtained from weighting coefficient memory 8. (Here, A=7/16, B=1/16, C=5/16, and D=3/16, for example.)

Note that "*" in weighting coefficient memory 8 indicates the position of a target pixel. The digitization error of the target pixel is multiplied with weighting coefficients A, B, C, and D to calculate weighting errors 71a, 71b, or 71c of surrounding four pixels (pixels corresponding to the positions of weighting coefficients A, B, C, and D) of the target pixel. Error memory 9 (9a, 9b, and 9c) is used for respectively storing weighting errors 71a, 71b, and 71c calculated by weighting error calculation section 7 (7a, 7b, and 7c). In the error memory, R, G, and B weighting errors 71a, 71b, and 71c are added to each of four pixels calculated by weighting error calculation section 7 (7a, 7b, and 7c) in pixel areas eA, eB, eC, and eD for target pixel "*". The added results are stored in error memory 9 (9a, 9b, and 9c). Correction signals 91a, 91b, and 91c are signals at the positions of "*", and are signals each obtained by accumulating the weighting errors of a total of the four pixels calculated in the above-mentioned procedures.

An embodiment of an image processing apparatus comprising digitization processing of the present invention will be described below with reference to FIG. 2. Note that the same reference numerals in FIG. 2 denote sections and signals having functions equivalent to those in the diagram of FIG. 1.

FIG. 2 is a schematic block diagram showing an image processing apparatus according to an embodiment of the present invention. This image processing apparatus receives input color signals read by a reading device such as a color image scanner of, e.g., 24-bit data per pixel (8 bits for each of R, G, and B) and executes digitization processing of this data which is then converted into, e.g., 3-bit data per pixel (1 bit for each of C, M, and Y). Thereafter, the apparatus outputs binary data to a color printer (not shown).

Correction sections 2a, 2b, and 2c respectively comprise adders, and correct R, G, and B (R: red, G: green, and B: blue) color signals of a target pixel. More specifically, sections 2a, 2b, and 2c respectively add R, G, and B input signals 1a, 1b, and 1c to color correction signals (Rw, Gw, and Bw) 91a, 91b, and 91c to output corrected color signals (Rc, Gc, and Bc) 21a, 21b, and 21c.

$$\left. \begin{array}{l} Rc = R + Rw \\ Gc = G + Gw \\ Bc = B + Bw \end{array} \right\} \quad (2)$$

R, G, and B corrected color signals (Rc, Gc, and Bc) 21a, 21b, and 21c are respectively converted into C, M, and Y (C: cyan, M: magenta, and Y: yellow) complementary color signals 31a, 31b, and 31c by complementary color conversion sections 3a, 3b, and 3c. In this case, conversion does not require high accuracy, and simple complementary color conversion given by the following equations may be employed:

$$\left. \begin{array}{l} C = 1 - Bc \\ M = 1 - Gc \\ Y = 1 - Bc \end{array} \right\} \quad (3)$$

C, M, and Y complementary color signals 31a, 31b, and 31c are respectively digitized by being compared with predetermined threshold values Th (Th1, Th2, Th3) by digitizer sections 4a, 4b, and 4c, and are output as digitization (binary) color signals 41a, 41b, and 41c. In this case, when complementary color signal 31a, 31b, or 31c is larger than corresponding threshold value Th, "1" is output as digitization color signal 41a, 41b, or 41c; otherwise, "0" is output.

Color conversion table 5 calculates R, G, and B reproduction color signals on the basis of C, M, and Y digitization color signals 41a, 41b, and 41c, and outputs reproduction color signals 51a, 51b, and 51c. Color conversion table 5 is formed of a ROM (read-only memory) to which C, M, and Y digitization color signals 41a, 41b, and 41c are input.

ROM 5 stores R, G, and B values in a table as shown in FIG. 4. These values determine eight colors, i.e., Y (yellow), M (magenta), C (cyan), R (red), G (green), B (blue), Bk (black), and W (white), defined by the data of C, M, and Y. These values are predetermined by measurement. For example, 8-color output patterns formed by mixing C, M, and Y are input by means of a scanner or the like, and obtained R, G, and B signals are stored in the table of ROM 5. Then, color conversion table 5 outputs R, G, and B reproduction color signals 51a, 51b, and 51c on the basis of input digitization color signals 41a, 41b, and 41c.

Digitization errors (Re, Ge, and Be) 61a, 61b, and 61c generated upon the digitization processing are then calculated. Digitization error calculation sections 6a, 6b, and 6c respectively comprise subtracters, and execute subtraction processing between corrected color signals (Rc, Gc, and Bc) 21a, 21b, and 21c output from correction sections 2a, 2b, and 2c, and reproduction color signals (Rp, Gp, and Bp) 51a, 51b, and 51c, thereby calculating digitization error signals 61a, 61b, and 61c.

More specifically, digitization errors (Re, Ge, and Be) are calculated as:

$$\left. \begin{array}{l} Re = Rc - Rp \\ Ge = Gc - Gp \\ Be = Bc - Bp \end{array} \right\} \quad (4)$$

Weighting error calculation sections 7a, 7b, and 7c respectively comprise multipliers, and multiply digitization errors (Re, Ge, and Be) 61a, 61b, and 61c with weighting coefficients 81a, 81b, and 81c stored in weighting coefficient emory 8, thereby outputting weighting errors 71a, 71b, and 71c. Weighting coefficient memory 8 comprises a memory for providing the aforementioned four weighting coefficients (A=7/16, B=1/16, C=5/16, and D=3/16) according to the positions corresponding to the surrounding four pixels of the target pixel *.

Weighting errors of four pixels are respectively calculated by:

$$\left. \begin{array}{l} ReA = A \times Rc \\ ReB = B \times Rc \\ ReC = C \times Rc \\ ReD = D \times Rc \\ GeA = A \times Gc \\ GeB = B \times Gc \\ GeC = C \times Gc \\ GeD = D \times Gc \\ BeA = A \times Bc \\ BeB = B \times Bc \\ BeC = C \times Bc \\ BeD = D \times Bc \end{array} \right\} \quad (5)$$

In this case, ReB, GeB, and BeB may be respectively calculated by:

$$\left. \begin{array}{l} ReB = Rp - (ReA + ReC + ReD) \\ GeB = Gp - (GeA + GeC + GeD) \\ BeB = Bp - (BeA + BeC + BeD) \end{array} \right\} \quad (6)$$

These weighting errors are stored at the corresponding positions of error memories 9a, 9b, and 9c. Each of error memories 9a, 9b, and 9c comprises a line memory for, e.g., six lines. Color correction signals 91a, 91b, and 91c are signals respectively read out of the positions of "*" of error memories 9a, 9b, and 9c. R, G, and B weighting errors 71a, 71B, and 71c each for pre-processed four pixels are stored at the positions of "*" of error memories 9a, 9b, and 9c.

Correction sections 2a, 2b, and 2c perform correction processing of input color signals 1a, 1b, and 1c using color correction signals 91a, 91b, and 91c calculated by the above-mentioned method.

Figure 3:
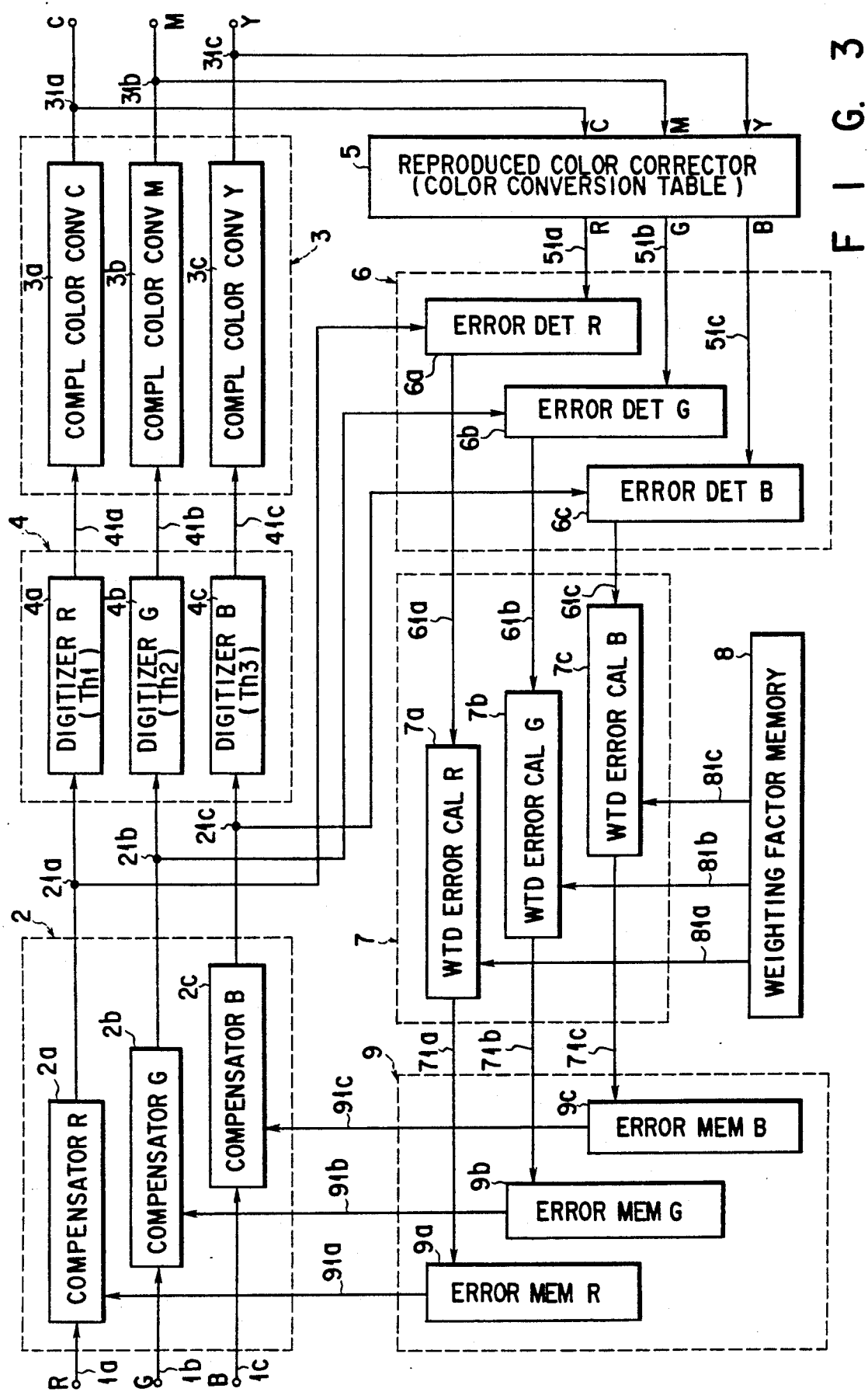
FIG. 3 is a schematic block diagram showing an arrangement of an image processing apparatus according to another embodiment of the present invention.

FIG. 3 shows an arrangement of the image processing apparatus according to another embodiment of the invention.

Although digitizer section 4 (4a, 4b, 4c) is arranged subsequent to complementary color conversion section 3 (3a, 3b, 3c) in the embodiment of FIG. 2, digitizer section 4 (4a, 4b, 4c) is arranged before complementary color conversion section 3 (3a, 3b, 3c) in the embodiment of FIG. 3.

According to the embodiment of FIG. 3, C, M, and Y signals (digitized color signals) 31a, 31b, and 31c, respectively corresponding to C, M, and Y signals 41a, 41b, and 41c in the embodiment of FIG. 2, are obtained. These signals 31a, 31b, and 31c are then used as the input for the color conversion table of ROM 5.

As described above, according to the above embodiment, since an error of the error diffusion method is calculated based on digitization color signals as C, M, and Y output results, an error can be correctly calculated even when the phases of output signals obtained by converting three input color signals by the error diffusion method are not synchronized. As a result, faithful color reproduction can be attained. In this case, since out-of-phase C, M, and Y output signals are converted into R, G, and B signals and are negatively fed back to the input side, i.e., phase states are negatively fed back to the input side using the R, G, and B signals, color reproducibility can be improved.

Since the reproduction color calculation section calculates R, G, and B reproduction color signals based on C, M, and Y output signals, the error diffusion processing is executed based on the R, G, and B reproduction color signals. Therefore, the error diffusion processing does not require color correction processing for converting input R, G, and B signals into C, M, and Y signals, thus simplifying processing.

Since an error of the "error diffusion method" is calculated based on C, M, and Y output signals, calculation accuracy is high, and color reproducibility can be improved. In addition, color reproduction fidelity can be prevented from being impaired due to an out-of-phase state of three color outputs obtained by independent processing for three colors in the conventional "error diffusion method".

In the above embodiment, digitized binary outputs are obtained. However, the present invention is not limited to this. For example, when a plurality of threshold values Th are set to respetive digitizers 4a, 4b, and 4c, multi-value outputs (e.g., c, M, and Y each having 3-bit) can be attained. Thus, optimal color reproduction corresponding to a multi-value color silver-chloride photograph printer, a sublimation type thermal transfer printer, and the like, can be attained.

As described above, according to the present invention, in a color image, an error can be accurately calculated even when a plurality of digitization output signals corresponding to a plurality of color signals have different phases. Thus, an image processing apparatus, which can eliminate the drawbacks of the error diffusion method, and can faithfully reproduce a color image, can be provided.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image processing apparatus comprising:
   means for inputting analog color information having first red information, first green information and first blue information;
   means for converting the input analog color information to digital color information having cyan information, magenta information and yellow information;
   means for storing a conversion table which defines a relation between first primary color information of red, green and blue, and second primary color information of cyan, magenta and yellow;
   means for reproducing color information having second red information, second green information and second blue information by using said converted digital color information having cyan information, magenta information and yellow information, in accordance with the conversion table stored in said storing means;
   means for detecting a difference between said input color information and said reproduced color information; and
   means for correcting the analog color information input by said inputting means in accordance with the difference detected by said detecting means so as to convert the corrected analog color information to the digital color information having cyan information, magenta information and yellow information.

2. An apparatus according to claim 1, further comprising:
   means for weighting by given weighting coefficient data the difference detected by said detecting means, so as to supply a weighted difference to said correcting means.

3. An apparatus according to claim 1, wherein said conversion table defines a relation between the three-primary color information of red, green, and blue, and eight-color information of red, green, blue, cyan magenta, yellow, black, and white, said eight-color information being represented by a combination of the three-color information of cyan, magenta, and yellow.

4. An apparatus, according to claim 1, wherein said converting means includes:
   means for complementarily color-converting the first primary color information of said input analog color information into complementary color-converted data containing the second primary color information; and
   means, coupled to said complementary color-converting means, for digitizing the complementary color-converted data to provide the digital color information.

5. An apparatus according to claim 1, wherein said converting means includes:
   means for digitizing the input analog color information to provide digitized data containing the first primary color information; and
   means, coupled to said digitizing means, for complementarily color-converting the digitized data containing the first primary color information into the digital color information containing the second primary color information.

6. An apparatus according to claim 1, wherein said converting means includes:
   means for complementarily color-converting red, green, and blue components of the first primary color information respectively into cyan, magenta, and yellow components of complementary color-converted data; and
   means, coupled with complementary color-converting means, for respectively digitizing the cyan, magenta, and yellow components of the complementary color-converted data to provide the digital color information, where the digitizing is performed based on one or more threshold values.

7. An apparatus according to claim 1, wherein said converting means includes:
   means for respectively digitizing red, green, and blue components of the first primary color information to provide digitized data, where the digitizing is performed based on one or more threshold values; and
   means, coupled to said digitizing means, for complementarily color-converting the red, green, and blue components of the first primary color information of said digitized data respectively into cyan, magenta, and yellow components of the digital color information.

8. An image processing method comprising the steps of:
   inputting analog color information having first red information, first green information and first blue information;

converting the input analog color information to digital color information having cyan information, magenta information and yellow information;

reproducing color information having second red information, second green information and second blue information by using said converted digital color information having cyan information, magenta information and yellow information in accordance with a conversion table which defines a relation between first primary color information of red, green and blue, and second primary color information of cyan, magenta and yellow;

detecting a color information difference between said input color information and said reproduced color information; and correcting the analog color information in accordance with the color information difference so as to convert the corrected analog color information to the digital color information having cyan information, magenta information and yellow information.

9. A method according to claim 8, further comprising the step of:

before the correcting step, weighting the color information difference by weighting coefficient data so as to supply weighted data which is used for the color information difference at said correcting step.

10. A method according to claim 8, wherein said converting step includes:

complementarily color-converting the first primary color information into complementary color-converted data containing the second primary color information; and digitizing the complementary color-converted data to provide the digital color information.

11. A method according to claim 8, wherein said converting step includes:

digitizing the corrected analog color information to provide digitized data containing the first primary color information; and complementarily color-converting the digitized data containing the first primary color information into the digital color information containing the second primary color information.

* * * * *